Patented Sept. 5, 1950

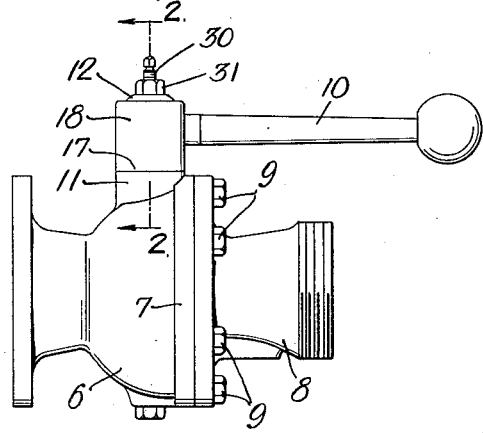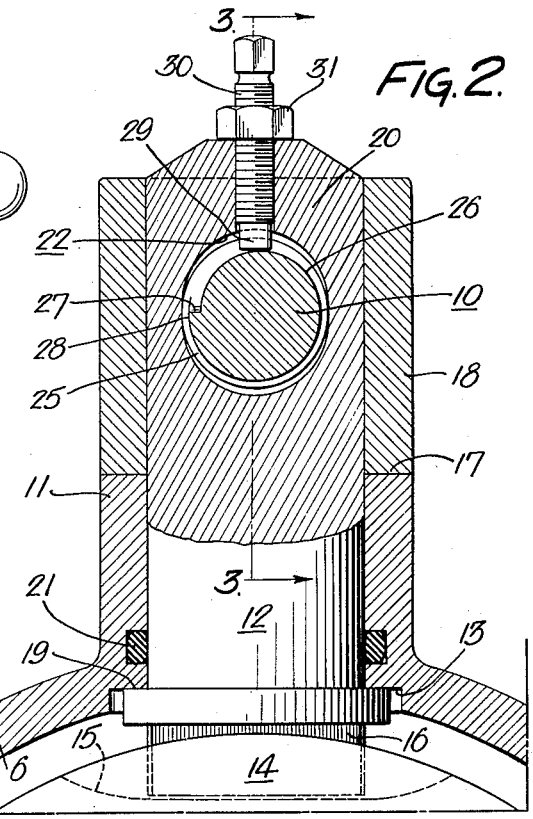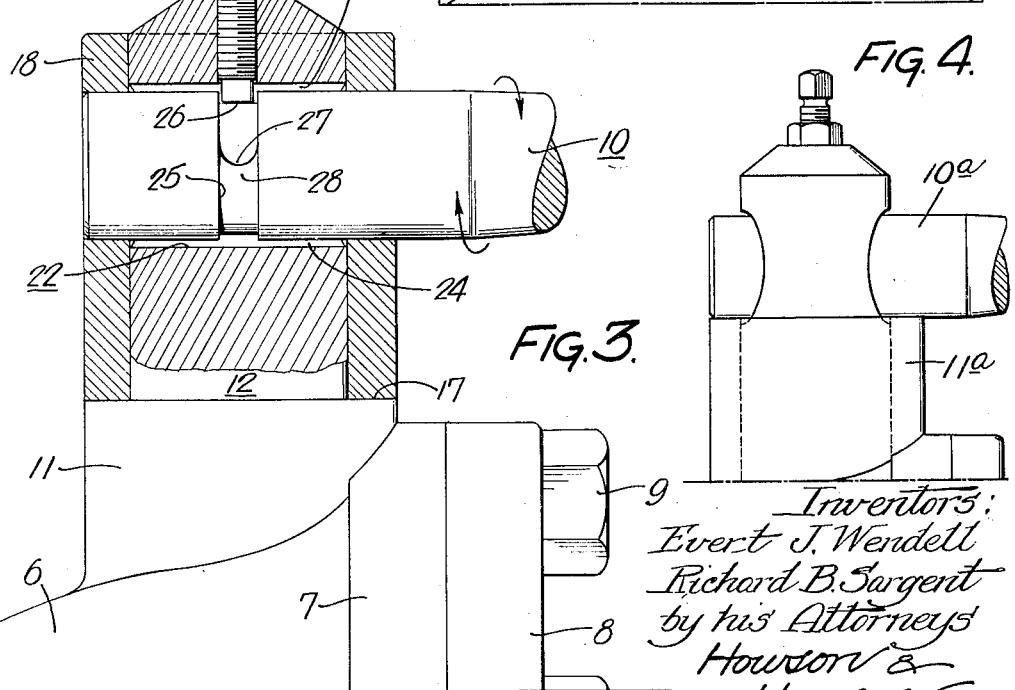

2,521,659

UNITED STATES PATENT OFFICE 2,521,659

VALVE STEM LOCK

Evert J. Wendell, Wayne, and Richard B. Sargent, Erdenheim, Pa., assignors to Hale Fire Pump Co., Conshohocken, Pa., a corporation of Pennsylvania Application May 16, 1947, Serial No. 748,582

7 Claims. (Cl. 251—163)

This invention relates to valves and particularly to means for locking ball valves in any desired position.

In the use of ball valves which have spherical rotatable valve elements, considerable difficulty is encountered because the valve proper tends to turn in the valve body especially when the valve is partially open or "gated." Contrary to the well known plug valve which depends largely for non-leaking operation on the friction between the plug and valve body, it is important in ball valve construction that there be a minimum of friction between the rotating valve member and the valve body. Consequently, a ball valve should be capable of being locked without exerting force between the valve and the valve body otherwise the sealing means would soon become worn and totally inoperative.

The essence of the invention resides in a cam formed on the valve handle which acts to clamp the valve stem securely to the valve body when the handle is twisted; therefore, a primary object is to provide a cam operated lock for a valve stem.

A further object is to provide a valve handle having a radial cam and a compression member surrounding the valve stem through which the valve handle protrudes, and a cam follower in the valve stem cooperating with the cam on the handle so that, when the handle is rotated on its longitudinal axis in the stem and sleeve, a compressive clamping action between the valve stem and valve body is obtained.

A further object of the invention is to provide a cam follower adjustably mounted in a rotatable valve stem which serves to retain a valve handle in the valve stem regardless of the adjustment of the follower.

A further object of the invention is to provide a shoulder on the valve stem having a bearing surface located internally of the valve body and against which the stem may be securely clamped to prevent rotation thereof.

A still further object of the invention is to provide an elongated aperture in the valve stem to accommodate the valve handle whereby slight transverse movement of the stem with respect to the handle can occur, but relative movement between the stem and the handle in a direction radial to the axis of the stem is prevented.

A still further object of the invention is to provide a single cam surface and a limit stop on a valve handle whereby the locking action can be achieved by rotation of the cam in one direction only.

Further objects of the invention will be apparent in the specification and drawings, in which:

Fig. 1 shows a side elevation of a ball valve assembly constructed in accordance with the invention;

Fig. 2 is an enlarged sectional detail of the valve stem and surrounding structure taken along lines 2—2 of Fig. 1 and showing the valve in locked position;

Fig. 3 is an enlarged detail showing in partial section the valve stem and surrounding structure as would appear in a section taken along lines 3—3 of Fig. 2 but of the entire valve, and Fig. 4 is a view corresponding to Fig. 3 but on a reduced scale showing a modification within the scope of the invention.

Referring now more particularly to the drawings, ball valve body 6 is of conventional construction and has a flange 7 and a removable flanged coupling 8 which is bolted to the valve body 6 by means of cap screws 9. A valve handle 10 is mounted on the body 6 and is revolvable in a plane parallel to the direction of fluid flow. The body or housing 6 has a valve stem guide in the form of a sleeve 11 which surrounds and supports valve stem 12 and is provided with an annular seat 13 at its internal connection with the body 6. A conventional ball valve 14 is enclosed in body 6 and has a recess or groove 15 to accommodate tongue 16 on the inner end of valve stem 12, thus providing a turning connection between the stem and the valve proper. Valve guide 11 terminates outwardly at shoulder 17 which supports and provides bearing surface for a separate sleeve 18. This sleeve 18 constitutes in effect a continuation of the guide sleeve 11.

Spaced directly above the tongue 16 on valve stem 12 is an annular shoulder 19 which cooperates with seat 13 in the valve body and limits upward movement of the stem in the valve guide 11. The shank 20 of the valve stem extends through guide 11, where a suitable annular seal 21 is provided to prevent fluid leakage, and terminates substantially at the top of sleeve 18. At approximately the midpoint of sleeve 18, a transverse hole is drilled through both the sleeve and the shank of the valve stem. This hole in the sleeve is preferably reamed to provide a close turning fit with handle 10, but the hole 22 is elongated in shank 20 in a direction along the axis of the shank to provide limited up and down movement of the valve stem with respect to the sleeve and the handle, at 23 and 24. The sides of hole 22 in shank 20, however, are of approximately the same diameter as handle 10 in order that no lost motion be present when the handle is revolved to turn the valve stem about its axis.

The portion of handle 10 contained within shank 20 has an annular groove 25, the base of which forms a cam surface 26 which extends from stop 27 completely around the handle and terminates at its highest point 28 within the groove 25. A cam follower 29 is formed from the extremity of a common threaded set screw 30 by means of which the projection of the cam follower 29 into hole 22 may be adjusted. Lock nut 31 on set screw 30 provides means for permanently retaining any desired adjustment of the cam follower.

The major diameter of the cam 26 is less than the diameter of the handle, the purpose of this construction being to prevent endwise removal of the handle from the sleeve and stem even if the set screw 30 be adjusted to clear the high lift portion 28 of the cam. However, it is possible to remove the handle completely by loosening lock nut 31 and backing out the set screw 30 until the cam follower 29 clears the groove 25 entirely.

In operation, the ball valve is customarily turned through an arc of only 90° to obtain either full on or full off operation of the valve. However, my locking construction is operative throughout the entire 360° permissible turning arc of valve stem 12. To release the locking action, the operator twists or rotates handle 10 about a longitudinal axis in a clock-wise direction, in Fig. 2, until stop 27 strikes against the cam follower 29. This prevents further rotation of the handle and the operator may then revolve the handle to open or close the valve as well as to position it in any intermediate station. Once having determined the desired valve setting, the operator then twists handle 10 in a counter clock-wise direction until the cam surface 26 engages cam follower 29 as shown in Fig. 2, thus causing the entire valve stem 12 to be forced upwardly until shoulder 19 bears against seat 13. The reaction to this force is carried through the portions of handle 10 in contact with sleeve 18 which then serves as a compression member between the handle and the outer seat 17 of the valve stem guide 11. It will be apparent that sufficient clearance at 24 between shank 20 and handle 10 must be provided in order to prevent bottoming of the valve stem against the handle before shoulder 19 engages seat 13. In actual practice, the clearance necessary to permit turning of the valve stem would be very slight.

In the modified embodiment of the invention illustrated in Fig. 4, the sleeve 18 has been eliminated and the guide sleeve 11a extended so as to form a seat for the handle 10a. The operation of the device is the same as in the previously described embodiment except that the handle in this case reacts directly with the sleeve 11a.

We have, therefore, disclosed a locking device for a valve which operates solely to clamp the valve stem and which requires merely a turn of the wrist both to lock and to unlock. Furthermore, an operator is always aware of the direction in which the handle must be turned to effect either a locking or an unlocking result because the limit stop 27 prevents locking action from taking place when the handle is turned in one direction. In the present instance the locking action occurs when the handle is turned in counterclockwise direction, but obviously the device could be reversed so that if preferred, the locking action occurs with the clockwise movement. The cam surface gradually increasing over a range of 360°, prevents inadvertent or accidental locking and also insures maximum valve life since the cam follower is readily adjustable to compensate for wear on the cam surface or cam follower.

It will be apparent that the invention is not limited to a ball type of valve since it can be applied in its broadest scope to many varieties of valves and other structures.

We claim:

1. A valve assembly comprising a valve body, a valve rotatably enclosed in said body, a valve stem adapted to rotate the valve, a shoulder on the valve stem adapted to abut an internal portion of the valve body, said valve stem having a shank portion containing a transverse aperture, a compression sleeve concentrically surrounding the shank portion and having a transverse aperture in alignment with the shank aperture, a handle rotatably mounted in the shank and sleeve apertures, a cam on the handle, a cam follower in the shank for cooperating with the cam to move the stem so as to engage the stem shoulder forcibly with the said abutment portion of the valve body, and bearing means for the sleeve on the valve body, said bearing being arranged to support the sleeve against the reaction forces imposed thereon when the cam is actuated to forcibly engage the said shoulder with the body abutment.

2. A valve lock comprising a valve handle having a cam surface, a valve stem in which said handle rotates, said stem being adjustable angularly about its longitudinal axis, a cam follower connected with said valve stem for cooperating with the cam surface, a shoulder on said valve stem, and sleeve means surrounding the valve stem, said cam surface and follower being arranged in the stem so that rotation of the said handle in the stem will effect a relative longitudinal movement of the stem and sleeve, and relatively fixed abutment means for both the sleeve and the shoulder for limiting the extent of said relative movement and against which the said sleeve and shoulder may be pressed by said cam to immobilize the valve stem against said angular movement and forming a bearing for the handle.

3. A valve lock constructed in accordance with claim 2 wherein the cam follower is threaded in the valve stem for adjustment with respect to the latter.

4. A valve assembly comprising a valve body, a valve rotatably enclosed in said body, a valve stem adapted to rotate the valve, a shoulder on the valve stem adapted to abut an internal portion of the valve body, said valve stem having a shank portion containing an elongated transverse aperture, a compression sleeve concentrically surrounding the shank portion and having a transverse aperture in alignment with the shank aperture, a handle rotatably mounted in the shank and the sleeve aperture and having a close turning fit in the sleeve aperture, a cam on the handle, a cam follower mounted in the shank for cooperation with the cam to move the stem so as to engage the stem shoulder forcibly with the said abutment portion of the valve body, and bearing means for the sleeve on the valve body, said bearing being arranged to support the sleeve against the reaction forces imposed thereon when the cam is actuated to forcibly engage the said shoulder with the body abutment.

5. A valve assembly comprising a valve body, a valve rotatably enclosed in said body, a valve stem adapted to rotate the valve, a shoulder on the valve stem adapted to abut an internal portion of the valve body, said valve stem having a shank portion containing an elongated transverse aperture, a compression sleeve concentrically surrounding the shank portion and having a transverse aperture in alignment with the shank aperture, a handle rotatably mounted in the shank and sleeve apertures said handle having a close turning fit in the sleeve aperture and a slidable fit in the elongated shank aperture, a cam on the handle the major diameter of the cam being less than the outside diameter of the handle, an adjustable cam follower mounted in the shank for cooperation with the cam to move the stem so as to engage the stem shoulder forcibly with the said abutment portion of the valve body, and bearing means for the sleeve on the valve body, said bearing being arranged to support the sleeve against the reaction forces imposed thereon when the cam is actuated to forcibly engage the said shoulder with the body abutment.

6. A locking device for a ball valve comprising a valve housing, a ball valve rotatably mounted in said housing, a valve stem guide projecting from the housing, a valve stem rotatably mounted in said guide, means on the inner end of said valve stem for engaging with and rotating the valve, a shoulder on the valve stem for limiting outward movement of the stem, a compression sleeve concentrically surrounding the outer portion of the stem and having a bearing surface rotatably connected with the outward edge of the valve stem guide, a threaded set screw axially mounted in the valve stem, means for locking said set screw in any desired position, a valve handle extending through the sleeve and the valve stem at right angles to the axis of the stem said handle having a close turning fit in the sleeve and an axially slidable fit in the valve stem, a cam surface on the handle adapted to cooperate with the set screw, the major diameter of the cam surface being less than the outside diameter of the handle, and a limit for the cam surface whereby lifting action between the cam and the set screw takes place in one direction of rotation only.

7. In a valve lock, a valve stem adjustable angularly about its longitudinal axis, a handle element connected with and movable with respect to said stem, a shoulder on said stem, a relatively fixed structure including an abutment for said shoulder, a cam on said handle coactive with the stem and constituting a means for shifting the stem to a position wherein the shoulder forcibly engages the abutment, and bearing means for the handle through which the handle is reactable with said structure to render the cam operative to so move the stem.

EVERT J. WENDELL.
RICHARD B. SARGENT.

REFERENCES CITED

The following references are of record in the file of this patent:

UNITED STATES PATENTS

| Number | Name | Date |
|---|---|---|
| 1,041,824 | Laser | Oct. 22, 1912 |
| 1,718,730 | Brown | June 25, 1929 |
| 1,722,752 | Karnath | July 30, 1929 |
| 1,946,745 | Johnston | Feb. 13, 1934 |
| 2,005,128 | Bowes | June 18, 1935 |
| 2,346,892 | Aldrich | Apr. 18, 1944 |
| 2,441,705 | Jacobsen | May 18, 1948 |